US008766590B2

(12) United States Patent
Lee

(10) Patent No.: US 8,766,590 B2
(45) Date of Patent: Jul. 1, 2014

(54) ENERGY STORAGE SYSTEM OF APARTMENT BUILDING, INTEGRATED POWER MANAGEMENT SYSTEM, AND METHOD OF CONTROLLING THE SYSTEM

(75) Inventor: Woog-Young Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 700 days.

(21) Appl. No.: 12/913,602

(22) Filed: Oct. 27, 2010

(65) Prior Publication Data

US 2011/0140648 A1 Jun. 16, 2011

(30) Foreign Application Priority Data

Dec. 16, 2009 (KR) .................. 10-2009-0125693

(51) Int. Cl.
*H02J 7/00* (2006.01)
*G05D 3/12* (2006.01)

(52) U.S. Cl.
USPC ........... 320/101; 700/287; 700/291; 700/297; 320/127; 320/137

(58) Field of Classification Search
USPC .......... 700/291, 286, 287; 320/101, 127, 137, 320/138; 323/220; 361/601, 602
See application file for complete search history.

(56) References Cited

U.S. PATENT DOCUMENTS

| | | | | |
|---|---|---|---|---|
| 7,233,843 | B2 * | 6/2007 | Budhraja et al. ............... | 700/291 |
| 7,715,951 | B2 * | 5/2010 | Forbes et al. .................. | 700/291 |
| 7,844,439 | B2 * | 11/2010 | Nasle et al. .................... | 703/18 |
| 8,442,698 | B2 * | 5/2013 | Fahimi et al. .................. | 700/297 |
| 8,463,453 | B2 * | 6/2013 | Parsons, Jr. .................... | 700/295 |
| 2004/0158360 | A1 * | 8/2004 | Garland et al. ................ | 700/286 |
| 2009/0063257 | A1 * | 3/2009 | Zak et al. ....................... | 705/10 |
| 2009/0326725 | A1 * | 12/2009 | Carlson et al. ................. | 700/291 |
| 2010/0004791 | A1 * | 1/2010 | West et al. ..................... | 700/291 |
| 2010/0023174 | A1 * | 1/2010 | Nagata et al. .................. | 700/287 |
| 2010/0161147 | A1 * | 6/2010 | Adam ............................ | 700/291 |
| 2011/0015798 | A1 * | 1/2011 | Golden et al. ................. | 700/291 |
| 2011/0087381 | A1 * | 4/2011 | Hirato et al. ................... | 700/291 |

FOREIGN PATENT DOCUMENTS

| | | |
|---|---|---|
| JP | 2001103676 | 4/2001 |
| JP | 2003348768 A | 12/2003 |
| JP | 2009033802 A | 2/2009 |
| KR | 1020020054357 A | 7/2002 |
| KR | 1020030036286 A | 5/2003 |
| KR | 1020070092377 A | 9/2007 |
| KR | 1020080107805 A | 12/2008 |
| KR | 1020090011784 A | 2/2009 |
| WO | 2008117392 | 10/2008 |

OTHER PUBLICATIONS

Johan H. R. Enslin et al., Integrated Photovoltaic Maximum Power Point Tracking Converter, Dec. 1997, IEE Transactions on Industrial Electronics, vol. 44, No. 6, pp. 769-776.*

(Continued)

*Primary Examiner* — Drew A Dunn
*Assistant Examiner* — Michael Dibenedetto
(74) *Attorney, Agent, or Firm* — Robert E. Bushnell, Esq.

(57) ABSTRACT

An energy storage system of an apartment building, an integrated power management system, and a method of controlling the integrated power management system. Power may be efficiently consumed by supplying remaining power stored in an energy storage system of each apartment to a common load.

18 Claims, 5 Drawing Sheets

(56) References Cited

OTHER PUBLICATIONS

Cited in the Korean Office Action issued by KIPO, dated Apr. 11, 2011, corresponding to Korean Patent Application No. 10-2009-0125693, together with Request for Entry.

Japanese Office Action issued by JPO on Jul. 24, 2012 in connection with Japanese Patent Application No. 2010-220895, which also claims Korean Patent Application No. 10-2009-0125693 and Request for Entry of the Accompanying Office Action attached herewith.

Chinese Office Action issued on Jan. 22, 2014 of the Chinese Patent Application No. 201010584546.8, which corresponds to the subject U.S. Patent Application.

\* cited by examiner

ENERGY STORAGE SYSTEM OF APARTMENT BUILDING, INTEGRATED POWER MANAGEMENT SYSTEM, AND METHOD OF CONTROLLING THE SYSTEM

CLAIM OF PRIORITY

This application makes reference to, incorporates the same herein, and claims all benefits accruing under 35 USC. §119 from an application for ENERGY STORAGE SYSTEM OF APARTMENT BUILDING, INTEGRATED POWER MANAGEMENT SYSTEM, AND METHOD OF CONTROLLING THE SYSTEM earlier filed in the Korean Intellectual Property Office filed on Dec. 16, 2009, and there duly assigned Serial No. 10-2009-0125693.

BACKGROUND OF THE INVENTION

1. Field of the Invention

One or more embodiments of the present invention relate to an energy storage system of an apartment building, an integrated power management system, and a method of controlling the system.

2. Description of the Related Art

Due to problems such as environmental destruction and exhaustion of natural resources, the interest in a system for storing power and efficiently utilizing the stored power is increasing and the importance of renewable energy such as sunlight is also increasing. In particular, renewable energy such as sunlight, wind, or tides is a natural resource that is unlimitedly supplied and power generation using the renewable energy does not cause pollution. Thus, research is being actively conducted on a method of utilizing renewable energy.

Currently, as a system for optimizing energy efficiency by adding information technology to an existing power grid and bi-directionally exchanging information between a power supplier and a consumer, a smart grid system is introduced.

SUMMARY OF THE INVENTION

One or more embodiments of the present invention include an improved energy storage system.

One or more embodiments of the present invention include an energy storage system capable of stably operating a whole electric system when an uninterruptible power supply (UPS) is used due to an error of a grid, e.g., a blackout, by being connected to a renewable power generation system as well as a battery, and a method of controlling the energy storage system.

Additional aspects will be set forth in part in the description which follows and, in part, will be apparent from the description, or may be learned by practice of the presented embodiments.

According to one or more embodiments of the present invention, an energy storage system of an apartment building converts power generated by a renewable power generation system so as to supply the converted power to a grid, a load, or a common load or to store the converted power in a battery, supplies power supplied from the grid to the load or converts the power supplied from the grid so as to store the converted power in the battery, and converts the power stored in the battery so as to supply the converted power to the grid, the load, or the common load. The energy storage system is connected to an integrated power management system of the apartment building via a network so as to transmit power consumption amount data regarding a power amount supplied to the grid or the load, and to control a power supply amount to be supplied to the common load based on control data of the integrated power management system.

The energy storage system may be included in every apartment of the apartment building.

The energy storage system may include a maximum power point tracking (MPPT) converter for converting the power generated by the renewable power generation system; a bi-directional inverter for converting the power generated by the renewable power generation system, the power stored in the battery, or the power supplied from the grid; a bi-directional converter for converting the power stored in the battery, the power generated by the renewable power generation system, or the power supplied from the grid; the battery for storing the power generated by the renewable power generation system or the power supplied from the grid; and an integrated controller for controlling operations of the MPPT converter, the bi-directional inverter and the energy storage system, transmitting the power consumption amount data to the integrated power management system connected via the network, and controlling the power supply amount to be supplied to the common load based on the control data of the integrated power management system.

The control data may be generated based on the power consumption amount data of the energy storage system of each apartment and a power consumption amount of the energy storage system at a time period, and may indicate a remaining power amount to be supplied from each apartment to the common load.

The control data may be updated by the integrated power management system in real time and then may be transmitted.

The renewable power generation system may be a solar photovoltaic system.

According to one or more embodiments of the present invention, an integrated power management system is connected to an energy storage system of each of a plurality of apartments in an apartment building via a network. The integrated power management system receives from the energy storage system power consumption amount data regarding a power amount supplied to a grid or a load of each apartment, calculates a remaining power amount of each apartment based on the received power consumption amount data, generates control data regarding a power supply amount to be supplied to a common load based on the calculated remaining power amount, and transmits the generated control data to the energy storage system of each apartment.

The integrated power management system may monitor the power consumption amount data and a power consumption amount of the common load in real time.

The integrated power management system may receive the power consumption amount data from the energy storage system of each apartment, calculate the remaining power amount of each apartment, generate the control data regarding the power supply amount to be supplied from the energy storage system of each apartment to the common load, and transmit the control data to the energy storage system of each apartment.

A power consumption amount of each apartment at a time period may be calculated based on the received power consumption amount data.

The time period may be when a power consumption amount is peaked.

The integrated power management system may monitor an actual power consumption amount of each apartment at the time period, compare the monitored actual power consumption amount and the calculated remaining power amount, generate the control data regarding the power supply amount to be supplied to the common load based on a comparison result, and transmit the control data to the energy storage system of each apartment.

If the actual power consumption amount is greater than the calculated remaining power amount, control data for reducing the power supply amount to be supplied to the common load may be generated and transmitted to the energy storage system.

According to one or more embodiments of the present invention, a method of controlling an integrated power management system connected to an energy storage system of each of a plurality of apartments in an apartment building via a network includes receiving from the energy storage system power consumption amount data regarding power supplied to a grid or a load of each apartment, calculating a remaining power amount of each apartment based on the received power consumption amount data, generating control data regarding a power supply amount to be supplied to a common load based on the calculated remaining power amount, and transmitting the generated control data to the energy storage system of each apartment.

Power of the energy storage system of each apartment may be supplied to the common load based on the transmitted control data.

The method may further include calculating a power consumption amount of each apartment at a time period based on the received power consumption amount data. The calculating of the remaining power amount of each apartment may be performed based on the calculated power consumption amount at the time period.

The time period may be when a power consumption amount is peaked.

The method may further include monitoring an actual power consumption amount of each apartment at the time period, comparing the monitored actual power consumption amount and the calculated remaining power amount, and generating the control data regarding the power supply amount to the common load based on a comparison result.

If the actual power consumption amount is greater than the calculated remaining power amount, control data for reducing the power supply amount to the common load may be generated.

The method may further include monitoring the power consumption amount data and a power consumption amount of the common load in real time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
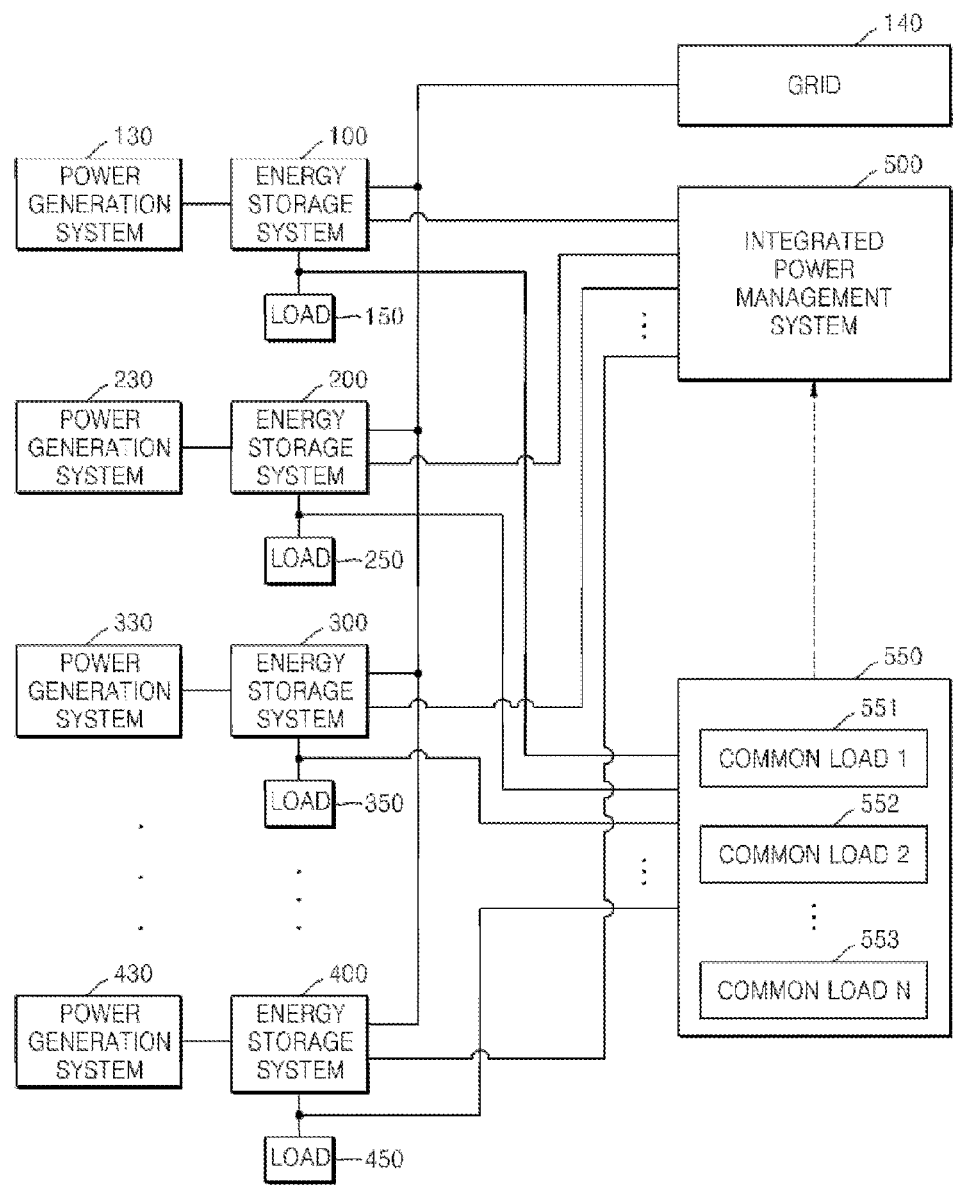
FIG. 1 is a schematic block diagram of an integrated power management system connected to gild-connected energy storage systems, constructed as an embodiment according to the principles of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a schematic block diagram of an integrated power management system 500 connected to grid-connected energy storage systems 100 through 400, according to an embodiment of the present invention.

Referring to FIG. 1, renewable power generation systems 130 through 430 are respectively connected to energy storage systems 100 through 400 of apartments in an apartment building. Here, energy storage systems 100 through 400 are connected to a grid 140 and are respectively connected to individual loads 150 through 450.

Energy storage systems 100 through 400 may convert power generated by power generation systems 130 through 430 so as to supply the converted power to grid 140, loads 150 through 450, or a common load 550. Also, the power generated by power generation systems 130 through 430 may be stored in batteries of energy storage systems 100 through 400, and power supplied from grid 140 may be supplied to loads 150 through 450 or may be converted and stored in the batteries of energy storage systems 100 through 400. Also, the power stored in the batteries of energy storage systems 100 through 400 may be supplied to grid 140, loads 150 through 450, or common load 550.

Energy storage systems 100 through 400 are connected to integrated power management system 500 via a network. Here, the network includes both wired and wireless communication networks. Energy storage systems 100 through 400 transmit power consumption amount data regarding power supplied to grid 140 or loads 150 through 450 via the network to integrated power management system 500 of the apartment building, and also control a power supply amount to be supplied to common load 550 based on control data transmitted from integrated power management system 500.

A detailed structure and function of energy storage systems 100 through 400 will be described later with reference to FIGS. 2 and 3.

Integrated power management system 500 is connected to energy storage systems 100 through 400 of the apartments. Integrated power management system 500 receives the power consumption amount data of the apartments from energy storage systems 100 through 400. Here, the power consumption amount data is determined based on power consumption amounts of loads 150 through 450 of the apartments from among the power generated by power generation systems 130 through 430, the power stored in the batteries of energy storage systems 100 through 400, or the power supplied from grid 140, and power supply amounts supplied from the apartments to grid 140.

Integrated power management system 500 receives the power consumption amount data from energy storage systems 100 through 400 and calculates remaining power amounts of the apartments. Here, the remaining power amounts refer to amounts of extra power that may be supplied from the apartments to common load 550. Common load 550 is a load that is commonly used by the apartments and includes, e.g., all loads required for elevators, lighting in an apartment complex, and various common equipments. Also, power supply to common load 550 may be performed at a time period when power consumption is peaked, e.g., an evening time period. For this, integrated power management system 500 may expect and calculate the remaining power amounts of the apartments at the peak time period based on the received power consumption amount data, generate control data regarding the power supply amount to be supplied to common load 550 based on the calculated remaining power amounts, and transmits the control data to energy storage systems 100 through 400. That is, integrated power management system 500 may control the amount of power to be supplied to common load 500 at a specific time period, i.e., peak time period.

Alternatively, integrated power management system 500 may monitor the power consumption amount data of the apartments and a power consumption amount of common load 550 in real time, may reflect their variations osr increases, and thus may control the power supply amounts to be supplied from energy storage systems 100 through 400 to common load 550. In more detail, integrated power management system 500 may update or control the power supply amounts from energy storage systems 100 through 400 to common load 550 in real time by comparing the received power consumption amount data and the calculated remaining power amounts of the apartments and generating and transmitting the control data regarding the power supply amounts to be supplied to common load 550 based on the comparison result. For example, if an actual power consumption amount of an apartment is greater than a calculated remaining power amount, control data thr reducing a power supply amount to be supplied from an energy storage system of the apartment to common load 550 is generated and transmitted such that the energy storage system of the apartment ignores a previously transmitted control data and reduces the power supply amount based on the newly transmitted control data. That is, integrated power management system 500 may control the amount of power to be supplied to common load 500 in real time.

Figure 2:
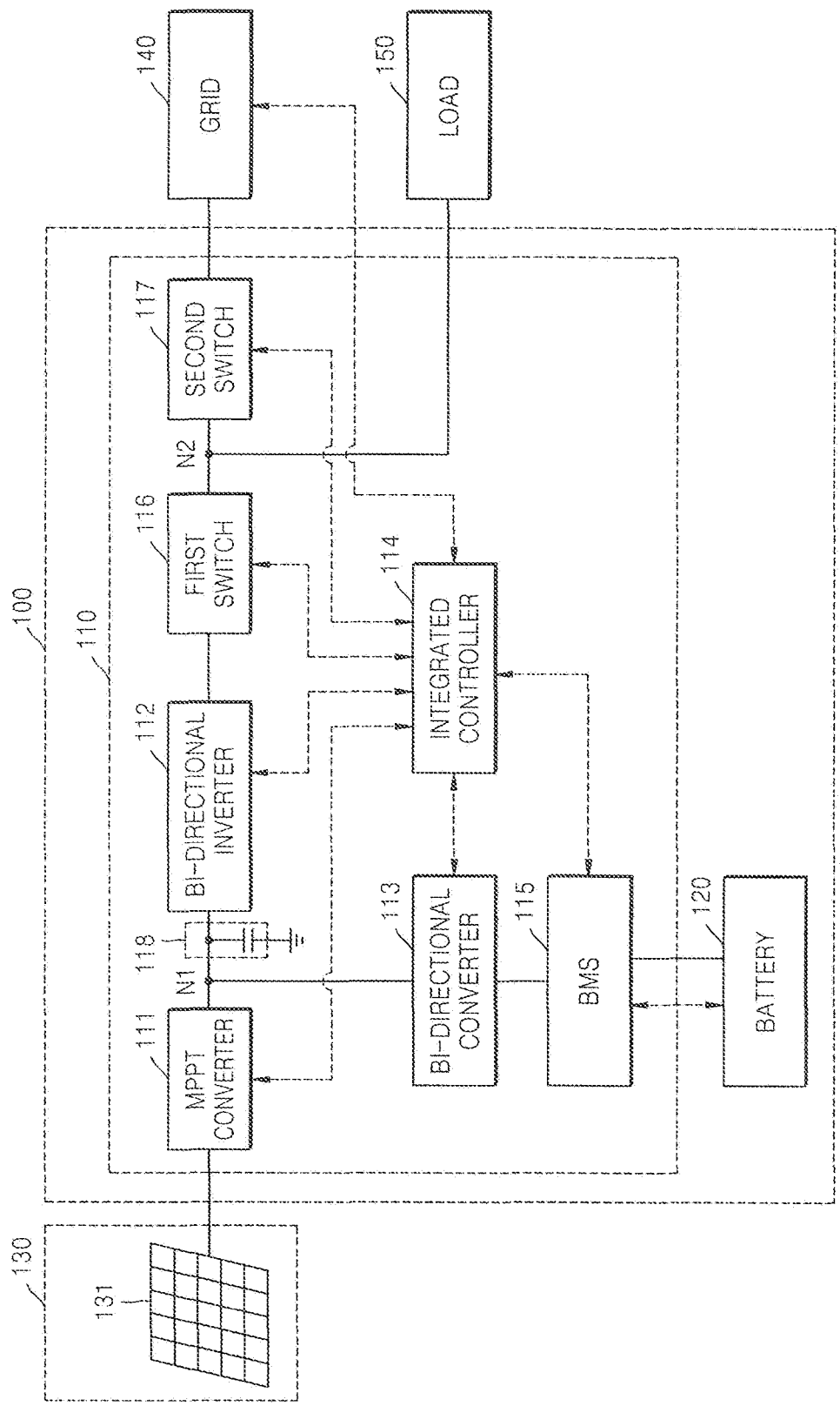
FIG. 2 is a schematic block diagram of the energy storage system illustrated in FIG. 1.

FIG. 2 is a schematic block diagram of energy storage system 100 illustrated in FIG. 1.

Referring to FIG. 2, energy storage system 100 includes a power management system 110 and a battery 120. Power management system 110 includes a maximum power point tracking (MPPT) converter 111, a bi-directional inverter 112, a bi-directional converter 113, an integrated controller 114, a battery management system (BMS) 115, a first switch 116, a second switch 117 and a direct current (DC) link unit 118. Power management system 110 is connected to battery 120, power generation system 130, grid 140, and load 150. Although energy storage system 100 separately includes power management system 110 and battery 120 in FIG. 2, embodiments of the present invention are not limited thereto and a power management system or a grid-connected energy storage system integrally including power management system 110 and battery 120 may also be used.

Power generation system 130 generates electrical energy and outputs the electrical energy to power management system 110. Although a solar photovoltaic (PV) system including solar cells 131 is illustrated in FIG. 2 as power generation system 130, power generation system 130 may also be a wind turbine system or a tidal turbine system. In addition, power generation system 130 includes all power generation systems for generating electrical energy by using renewable energy such as solar heat or geothermal heat. In particular, solar cells 131 for generating electrical energy by using sunlight may be easily installed in a house or a factory and thus are appropriate to be applied to energy storage system 100 of a house.

Grid 140 includes a power plant, a substation, power transmission cables, etc. When grid 140 operates normally, grid 140 supplies power to battery 120 or load 150 or receives power from power generation system 130 or battery 120 based on whether first switch 116 or second switch 117 is turned on or off. When grid 140 operates abnormally, for example, in a blackout or during a maintenance or repair work of electrical equipment, power supply from grid 140 to battery 120 or load 150 is stopped and power supply from power generation system 130 or battery 120 to grid 140 is also stopped.

Load 150 consumes power generated by power generation system 130, power stored in battery 120, or power supplied from grid 140, and may be, e.g., a house or a factory.

Common load 550 is a load that is commonly used by an apartment building and includes, e.g., all loads required for elevators, common lightings and common equipments. Power supply to common load 550 is performed by the control of integrated controller 114. Integrated controller 114 controls power supply to common load 550 based on control data transmitted from integrated power management system 500.

MPPT converter 111 converts a DC voltage output from solar cells 131 into a DC voltage to be input to a first node N1. Since the output of solar cells 131 has variable features based on a load condition and climate changes in insolation and temperature, MPPT converter 111 controls solar cells 131 to generate maximum power. That is, MPPT converter 111 functions as a boost DC-DC converter for outputting a DC voltage by boosting a DC voltage output from solar cells 131 and also functions as an MPPT controller. For example, a range of the DC voltage output from MITT converter 111 may be from about 300 V to about 600 V. Also, MPPT converter 111 performs MPPT control for tracking a maximum power output voltage of solar cells 131 based on changes in insolation, temperature, etc. For example, the MPPT control may include perturbation and observation (P&O) control, incremental conductance (IncCond) control, and power to voltage control. The P&O control increases or reduces a reference voltage by measuring power and a voltage of solar cells 131; the IncCond control compares and controls output conductance and incremental conductance of solar cells 131; and the power to voltage control controls a power to voltage gradient. However, the MPPT control is not limited thereto and may also include another type of MPPT control.

DC link unit 118 is connected between first node N1 and bi-directional inverter 112 in parallel. DC link unit 118 maintains the DC voltage output from MPPT converter 111 as a DC link voltage, e.g., DC 380 V, and provides the DC link voltage to bi-directional inverter 112 or bi-directional converter 113. Here, DC link unit 118 may be an electrolytic capacitor, a polymer capacitor or a multi-layer ceramic capacitor (MLCC). First node N1 may have an unstable voltage level due to a variation in the DC voltage output from solar cells 131, an instantaneous voltage sag of grid 140, a peak load of load 150 or the like. Accordingly, DC link unit 118 provides a stable DC link voltage so as to normally operate bi-directional converter 113 and bi-directional inverter 112. Although DC link unit 118 is separately illustrated in FIG. 2, DC link unit 118 may be included in bi-directional converter 113, bi-directional inverter 112, or MPPT converter 111.

Bi-directional inverter 112 is connected between first node N1 and grid 140. Bi-directional inverter 112 converts a DC voltage output from MPPT converter 111 or bi-directional converter 113 into an alternating current (AC) voltage to be input to grid 140 or load 150, or converts an AC voltage provided from grid 140 into a DC voltage so as to provide the DC voltage to first node N1. That is, bi-directional inverter 112 functions as an inverter for converting a DC voltage into an AC voltage and also functions as a rectifier for converting an AC voltage into a DC voltage.

Bi-directional inverter 112 rectifies an AC voltage input from grid 140 via first and second switches 116 and 117 into a DC voltage to be stored in battery 120 so as to output the DC voltage, and converts a DC voltage output from power generation system 130 or battery 120 into an AC voltage to be input to grid 140 so as to output the AC voltage. In this case, the AC voltage output to grid 140 has to correspond to a power quality standard of grid 140, e.g., above a power factor of 0.9 and below a total harmonic distortion (THD) of 5%. For this, bi-directional inverter 112 has to suppress generation of invalid power by synchronizing a phase of an output AC voltage to the phase of grid 140 and has to control a level of the AC voltage. Also, bi-directional inverter 112 may include a filter for removing harmonics from the AC voltage output to grid 140, and may perform functions such as voltage variation range restriction, power factor improvement, DC component removal and transient phenomenon protection.

Bi-directional inverter 112 functions as an inverter for converting DC power output from power generation system 130 or battery 120 into AC power to be supplied to grid 140, load 150, or common load 550, and also functions as a rectifier for converting AC power supplied from grid 140 into DC power to be supplied to battery 120.

Bi-directional converter 113 is connected between first node N1 and battery 120, and converts a DC voltage output from first node N1 into a DC voltage to be stored in battery 120, and also converts a DC voltage stored in battery 120 into a DC voltage to be transmitted to first node N1. For example, if DC power generated by power generation system 130 or AC power supplied from grid 140 is charged to battery 120, i.e., in a battery charge mode, bi-directional converter 113 functions as a converter for reducing a DC voltage level of first node N1 or a DC link voltage level of DC link unit 118, e.g. 380 V DC, into a voltage level to be stored in battery 120, e.g., 100 V DC. Also, when power charged in battery 120 is supplied to grid 140, load 150, or common load 550, i.e., in a battery discharge mode, bi-directional converter 113 functions as a converter for increasing a voltage level stored in battery 120, e.g., 100 V DC, into a DC voltage level of first node N1, or a DC link voltage level of DC link unit 118, e.g., 380, V DC. Bi-directional converter 113 converts DC power generated by power generation system 130 or DC power converted from AC power supplied from grid 140 into DC power to be stored in battery 120, and converts DC power stored in battery 120 into DC power to be input to bi-directional inverter 112 and then to be supplied to grid 140, load 150, or common load 550.

Battery 120 stores power supplied from power generation system 130 or grid 140. Battery 120 may be formed of a plurality of battery cells arranged in series or in parallel so as to increase a capacity and an output. Charge or discharge of battery 120 is controlled by BMS 115 or integrated controller 114. Battery 120 may be one of various batteries such as a nickel-cadmium battery, a lead storage battery, a nickel metal hydride (NiMH) battery, a lithium ion battery and a lithium polymer battery. The number of battery cells included in battery 120 may be determined based on, for example, power capacity and design conditions required by energy storage system 100.

BMS 115 is connected to battery 120 and controls charge and discharge of battery 120 by the control of integrated controller 114. Discharge power from battery 120 to bi-directional converter 113 and charge power from bi-directional converter 113 to battery 120 are transmitted via BMS 115. Also, BMS 115 performs overcharge protection, overdischarge protection, overcurrent protection, overheating protection and cell balancing in order to protect battery 120. For this, BMS 115 may calculate a state of charge (SOC) and a state of health (SOH) of battery 120 by detecting a voltage, a current, and a temperature of battery 120, and thus may monitor a remaining power amount, a remaining lifetime and the like of battery 120.

BMS 115 may include a sensor for detecting a voltage, a current, and a temperature of battery 120, a micro computer for determining overcharge, overdischarge, overcurrent, cell balancing, an SOC, and an SOH based on the detection result, and a protection circuit for performing charge or discharge prevention, fuse breaking, cooling or the like based on a control signal of the micro computer. Although BMS 115 is included in power management system 110 and is separated from battery 120 in FIG. 3, BMS 115 may be integrated with battery 120 in a battery pack. Also, BMS 115 controls charge or discharge of battery 120 by the control of integrated controller 114, and transmits information regarding a charged power amount calculated by using state information of battery 120, e.g., the SOC, to integrated controller 114.

First switch 116 is connected between bi-directional inverter 112 and a second node N2. Second switch 117 is connected between second node N2 and grid 140. First and second switches 116 and 117 may be turned on or off by the control of integrated controller 114. First and second switches 116 and 117 supply or block power from power generation system 130 or battery 120 to grid 140 or load 150, or supply or block power from grid 140 to load 150 or battery 120. For example, when power generated by power generation system 130 or power stored in battery 120 is supplied to grid 140, integrated controller 114 turns on first and second switches 116 and 117. When the power is supplied to only load 150, integrated controller 114 turns on only first switch 116 and turns off second switch 117. Also, when power supplied, from grid 140 is supplied to only load 150, integrated controller 114 turns off first switch 116 and turns on second switch 117.

When grid 140 operates abnormally, for example, in a blackout or during a repair work of a power cable, second switch 117 blocks power supply to grid 140 by the control of integrated controller 114 so as to realize a sole operation of energy storage system 100. In this case, integrated controller 114 prevents a short-distance access accident such as an electric shock of a cable maintenance or repair man who accesses grid 140 or a bad influence of grid 140 to electrical equipment, by separating power management system 110 from grid 140. Also, when grid 140 is recovered from the abnormal operation while power generated by power generation system 130 or power stored in battery 120 is supplied to load 150 in the sole operation, a phase difference may occur between a voltage output from grid 140 and a voltage output from battery 120 in the sole operation, and thus power management system 110 may be damaged. In order to solve this problem, integrated controller 114 prevents the sole operation.

Integrated controller 114 controls general operation of power management system 110 or energy storage system 100. Integrated controller 114 includes a communication module for communicating with integrated power management system 500 via a network. Integrated controller 114 transmits power consumption amount data of energy storage system 100, i.e., data regarding power supplied to grid 140 or consumed by load 150, to integrated power management system 500, and also controls a power supply amount to be supplied to common load 550 based on the control data transmitted from integrated power management system 500. Integrated controller 114 transmits data regarding an actual power consumption amount of an apartment at a time period, e.g., a time period for supplying power to common load 550, to integrated power management system 500. Accordingly, integrated power management system 500 may monitor the power consumption amount of the apartment in real time and thus may control the power supply amount from the apartment to common load 550. Because integrated controller 114 communicates with integrated power management system 500 by Request and Response, real time monitoring is possible.

Figure 3:
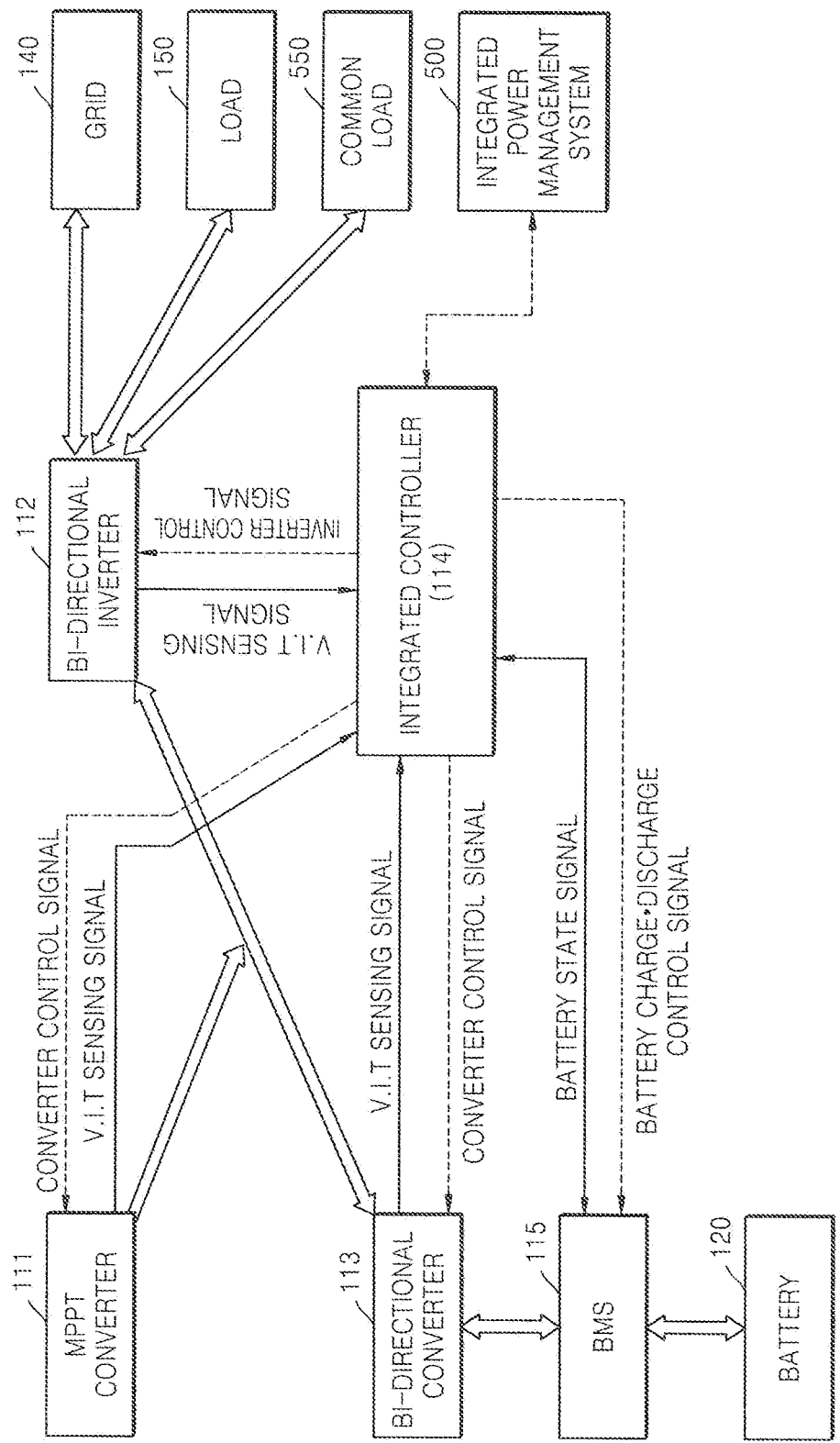
FIG. 3 illustrates flows of power and control signals between the energy storage system and the integrated power management system illustrated in FIG. 1.

FIG. 3 illustrates flows of power and control signals between energy storage system 100 and integrated power management system 500 illustrated in FIG. 1.

Referring to FIG. 3, a DC voltage converted by converter MPPT 111 is provided to bi-directional inverter 112 and bi-directional converter 113. The provided DC voltage is converted by bi-directional inverter 112 into an AC voltage so as to be provided to grid 140, or is converted by bi-directional converter 113 into a DC voltage so as to be charged in battery 120 via BMS 115. The DC voltage charged in battery 120 is converted by bi-directional converter 113 into a DC voltage to be input to bi-directional inverter 112, and then is converted by bi-directional inverter 112 into an AC voltage suitable for grid 140 so as to be provided to grid 140.

Integrated controller 114 controls general operation of energy storage system 100 and determines an operation mode of energy storage system 100, e.g., whether to supply generated power to grid 140 or load 150, or to store the power in battery 120, or whether to store power supplied from grid 140, in battery 120.

Integrated controller 114 transmits control signals for controlling switching operations of MPPT converter 111, bi-directional inverter 112 and bi-directional converter 113. Here, a control signal minimizes a loss caused by power conversion of a converter/inverter by optimizing a duty of an input voltage of the converter/inverter. For this, integrated controller 114 receives signals obtained by sensing a voltage, a current, and a temperature from an input terminal of each of MPPT converter 111, bi-directional inverter 112 and bi-directional converter 113 and transmits converter/inverter control signals based on the received signals.

Integrated controller 114 receives from grid 140 grid information regarding a voltage, a current, and a temperature of grid 140 based on an operation state of grid 140. Integrated controller 114 determines based on the grid information whether grid 140 operates abnormally or has recovered from the abnormal operation, blocks power supply to grid 140 in the abnormal operation, and prevents the sole operation of energy storage system 100 by matching an output of bi-directional inverter 112 and power supplied from grid 140 when grid 140 is reconnected after being recovered.

Integrated controller 114 receives a charge and discharge state signal of battery 120 by communicating with BMS 115 and determines the operation mode of energy storage system 100 based on the charge and discharge state signal. Also, integrated controller 114 transmits the charge and discharge state signal to BMS 115 based on the operation mode, and thus BMS 115 controls charge and discharge of battery 120.

Integrated controller 114 transmits the power consumption amount data of energy storage system 100 to integrated power management system 500 by communicating with integrated power management system 500, and receives from integrated power management system 500 the control data regarding a power supply amount to be supplied to common load 550 so as to control the power supply amount to be supplied to common load 550.

Figure 4:
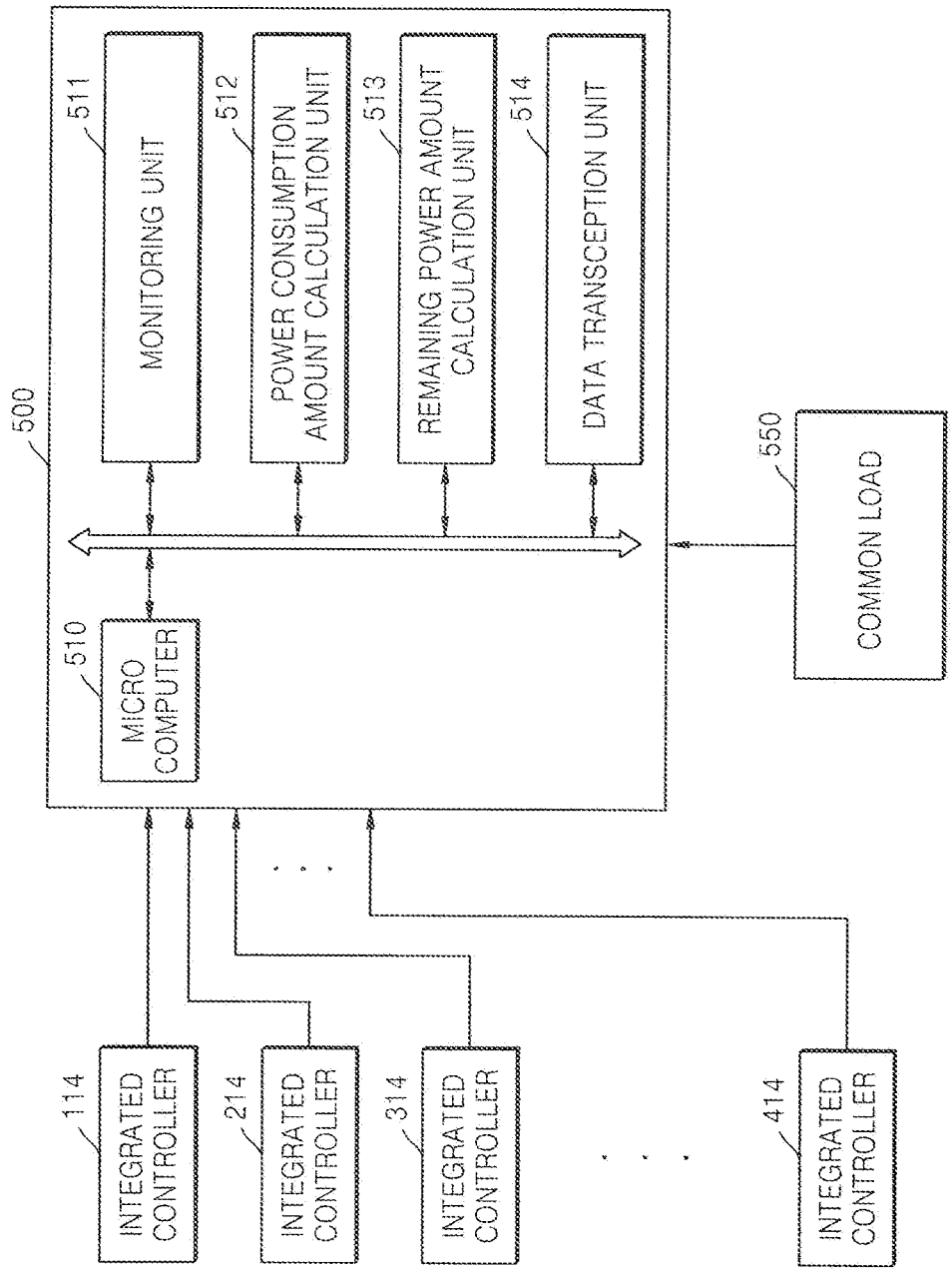
FIG. 4 is a schematic block diagram of the integrated power management system 500 illustrated in FIG. 1.

FIG. 4 is a schematic block diagram of integrated power management system 500 illustrated in FIG. 1.

Referring to FIG. 4, integrated power management system 500 includes a micro computer 510, a monitoring unit 511, a power consumption amount calculation unit 512, a remaining power amount calculation unit 513 and a data transception unit 514.

Micro computer 510 controls general operation of integrated power management system 500.

Monitoring unit 511 monitors power consumption amount data of energy storage systems 100 through 400 of apartments and an actual power consumption amount of common load 550 in real time.

Data transception unit 514 communicates with integrated controllers 114 through 414 of energy storage systems 100 through 400 so as to receive the power consumption amount data to be used to control power supply amounts to be supplied to common load 550.

Power consumption amount calculation unit 512 calculates power consumption amounts of the apartments from the power consumption amount data transmitted from integrated controllers 114 through 414.

Remaining power amount calculation unit 513 calculates remaining power amounts of energy storage systems 100 through 400 based on the power consumption amount data transmitted from integrated controller 114 in real time, in order to supply the remaining power to common load 550.

Micro computer 510 transmits data regarding the remaining power amounts to integrated controllers 114 through 414 of energy storage systems 100 through 400 so as to control power supply to common load 550. Also, micro computer 510 monitors actual power consumption amounts of the apartments at a time period, compares the actual power consumption amounts and the calculated remaining power amounts, and generates control data regarding power supply amounts to common load 550 based on the comparison result so as to transmit the control data to energy storage systems 100 through 400 of the apartments. In more detail, if an actual power consumption amount of an apartment is greater than the calculated remaining power amount, micro computer 510 generates control data for reducing a power supply amount to common load 550 so as to transmit the control data to an energy storage system of the apartment.

Referring back to FIG. 1, common load 550 may include a plurality of common loads, e.g., first through nth common loads 551 through 553. In this case, priorities may be given to the first through nth common loads 551 through 553 and power may be supplied to the first through nth common loads 551 through 553 based on their priorities. Also, power supplied from the apartments to common load 550 may be subtracted from electric bills by bi-directional wattmeters installed between energy storage systems 100 through 400 and integrated power management system 500.

Figure 5:
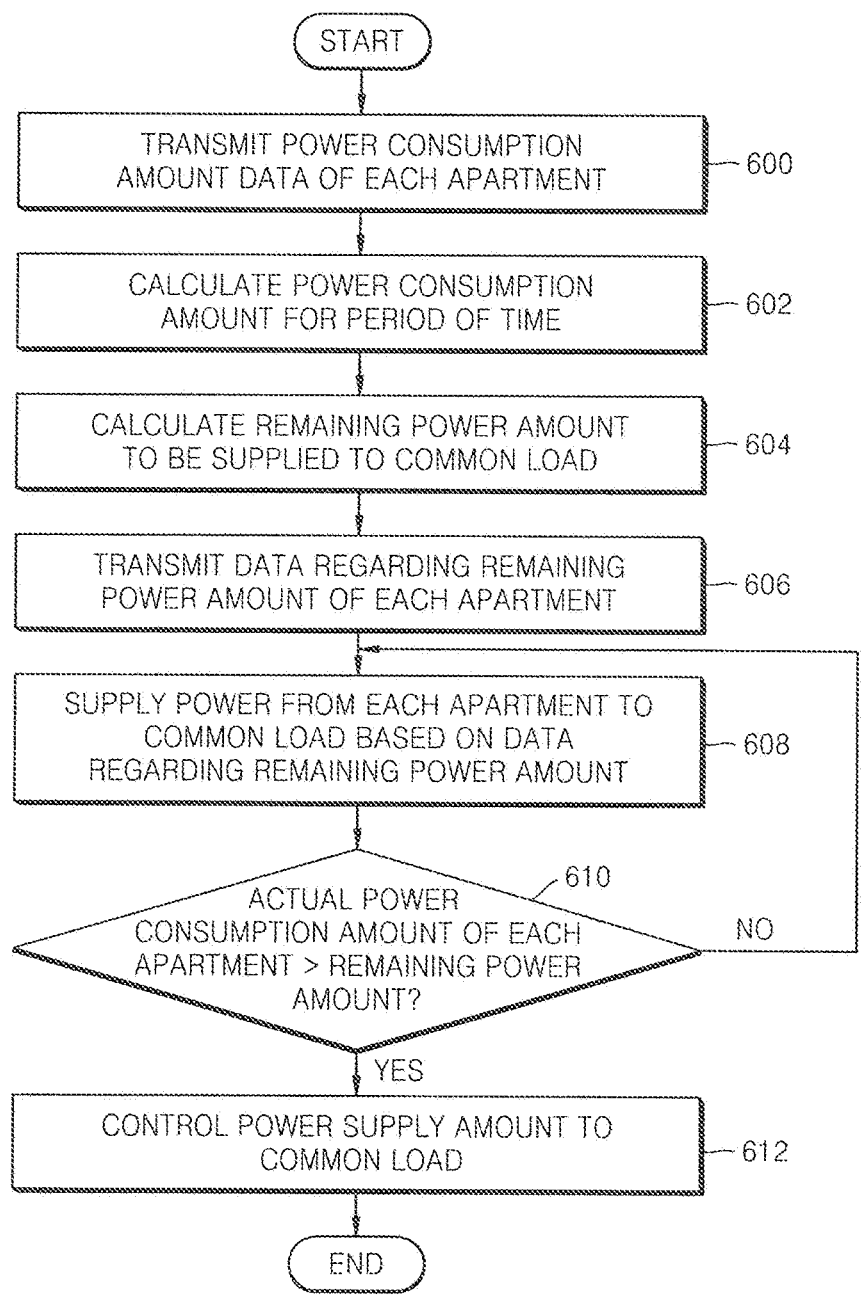
FIG. 5 is a flowchart of a method of controlling an integrated power management system, as an embodiment according to the principles of the present invention.

FIG. 5 is a flowchart of a method of controlling an integrated power management system, as an embodiment according to the principles of the present invention.

Referring to FIG. 5, in operation 600, current power consumption amount data of each apartment is transmitted. In operation 602, a power consumption amount of each apartment for a period of time, i.e., for peak time, is calculated. In operation 604, a remaining power amount to be supplied from each apartment to a common load is calculated, in operation 606, data regarding the remaining power amount of each apartment is transmitted. In operation 608, power is supplied from each apartment to the common load based on the data regarding the remaining power amount. In operation 610, an actual power consumption amount of each apartment is compared to the remaining power amount. The actual power consumption amount data of each apartment refers to the amount of power that is actually consumed by each apartment, and is transmitted subsequently to the current power consumption amount data of each apartment. If the actual power consumption amount is greater than the remaining power amount in operation 610, in operation 612, a power supply amount to the common load is controlled to be reduced.

Otherwise, if the actual power consumption amount is equal to or less than the remaining power amount in operation 610, the method returns to operation 608 and the power is continuously supplied to the common load based on the remaining power amount. Here, power supply to the common load may also be controlled by monitoring a power consumption amount of each apartment or a power consumption amount of the common load in real time.

As described above, according to the one or more of the above embodiments of the present invention, power may be efficiently consumed by supplying remaining power stored in an energy storage system of each apartment to a common load.

In particular, power may be stably supplied to common equipments of an apartment building even at a time period when power consumption is high.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An energy storage system of an apartment building,
the energy storage system converting power generated by a renewable power generation system so as to supply the converted power to a grid, a load, or a common load or to store the converted power in a battery for each apartment in the apartment building, supplying power supplied from the grid to the load, converting the power supplied from the grid so as to store the converted power in the battery, and converting the power stored in the battery so as to supply the converted power to the grid, the load, or the common load, and
the energy storage system being connected to an integrated power management system of the apartment building via a network so as to transmit power consumption amount data for each apartment regarding a power amount supplied to the grid or the load, and to control a power supply amount to be supplied to the common load from each apartment based on control data of the integrated power management system by reducing the power supply amount from individual apartments to the common load for all apartments in the apartment building or the grid when the power consumption amount data for each apartment is greater than a calculated remaining power amount for each apartment.

2. The energy storage system of claim 1, wherein the energy storage system is included in every apartment of the apartment building.

3. The energy storage system of claim 1, comprising:
a maximum power point tracking (MPPT) converter for converting the power generated by the renewable power generation system;
a bi-directional inverter for converting the power generated by the renewable power generation system, the power stored in the battery, or the power supplied from the grid;
a bi-directional converter for converting the power stored in the battery, the power generated by the renewable power generation system, or the power supplied from the grid;
the battery for storing the power generated by the renewable power generation system or the power supplied from the grid; and
an integrated controller for controlling operations of the MPPT converter, the bi-directional inverter and the energy storage system, transmitting the power consumption amount data to the integrated power management system connected via the network, and controlling the power supply amount to be supplied to the common load based on the control data of the integrated power management system.

4. The energy storage system of claim 1, wherein the control data is generated based on the power consumption amount data of the energy storage system of each apartment in real time and a power consumption amount of the energy storage system at a time period, and indicates a remaining power amount to be supplied from each apartment to the common load.

5. The energy storage system of claim 4, wherein the control data is updated by the integrated power management system in real time and then is transmitted.

6. The energy storage system of claim 1, wherein the renewable power generation system is a solar photovoltaic system.

7. An integrated power management system,
the integrated power management system being connected to an energy storage system of each of a plurality of apartments in an apartment building via a network,
the integrated power management system receiving from the energy storage system power consumption amount data regarding a power amount supplied to a grid or a load of each apartment, calculating a remaining power amount of each apartment based on the received power consumption amount data, generating control data regarding a power supply amount to be supplied to a common load for all the plurality of apartments based on the calculated remaining power amount, and transmitting the generated control data to the energy storage system of each apartment reducing the power supply amount from individual apartments to the common load for all apartments of the plurality of apartments or grid when the power consumption amount of the individual apartment is greater than the calculated remaining power amount for said individual apartment.

8. The integrated power management system of claim 7, wherein the integrated power management system monitors the power consumption amount data and a power consumption amount of the common load in real time.

9. The integrated power management system of claim 7, wherein a power consumption amount of each apartment at a time period is calculated based on the received power consumption amount data.

10. The integrated power management system of claim 9, wherein the time period is when a power consumption amount is peaked.

11. The integrated power management system of claim 9, wherein the integrated power management system monitors an actual power consumption amount of each apartment at the time period, compares the monitored actual power consumption amount and the calculated remaining power amount, generates the control data regarding the power supply amount to be supplied to the common load based on a comparison result, and transmits the control data to the energy storage system of each apartment.

12. The integrated power management system of claim 11, wherein, if the actual power consumption amount is greater than the calculated remaining power amount, control data for reducing the power supply amount to be supplied to the common load is generated and transmitted to the energy storage system.

13. A method of controlling an integrated power management system connected to an energy storage system of each of a plurality of apartments in an apartment building via a network, the method comprising:
receiving from the energy storage system power consumption amount data regarding power supplied to a grid or a load of each apartment;
calculating a remaining power amount of each apartment based on the received power consumption amount data;
generating control data regarding a power supply amount to be supplied to a common load based on the calculated remaining power amount;
transmitting the generated control data to the energy storage system of each apartment;
monitoring an actual power consumption amount of each apartment of the plurality of apartments at a time period;
comparing the monitored actual power consumption amount and a calculated remaining power amount for each apartment of the plurality of apartments at the time period and creating a comparison result; and
generating the control data regarding the power supply amount to be supplied to a common load for all the plurality of apartments from each apartment based on the comparison result, said control data reducing the power supply amount from individual apartments to the common load for all apartments when the monitored actual power consumption amount of the individual apartment is greater than the calculated remaining power amount for said individual apartment.

14. The method of claim 13, wherein power of the energy storage system of each apartment is supplied to the common load based on the transmitted control data.

15. The method of claim 13, further comprising calculating a power consumption amount of each apartment at the time period based on the received power consumption amount data,
wherein the calculating of the remaining power amount comprises calculating the remaining power amount of each apartment based on the calculated power consumption amount at the time period.

16. The method of claim 15, wherein the time period is when a power consumption amount is peaked.

17. The method of claim 13, wherein, if the actual power consumption amount is greater than the calculated remaining power amount, control data for reducing the power supply amount to be supplied to the common load is generated.

18. The method of claim 13, further comprising monitoring the power consumption amount data and a power consumption amount of the common load in real time.

* * * * *